US012734801B2

(12) United States Patent
Ishii

(10) Patent No.: US 12,734,801 B2
(45) Date of Patent: Sep. 15, 2026

(54) DRIVING CIRCUIT AND PRINTING APPARATUS

(71) Applicant: CANON KABUSHIKI KAISHA, Tokyo (JP)

(72) Inventor: Ken Ishii, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 127 days.

(21) Appl. No.: 18/806,412

(22) Filed: Aug. 15, 2024

(65) Prior Publication Data

US 2025/0074045 A1 Mar. 6, 2025

(30) Foreign Application Priority Data

Sep. 5, 2023 (JP) ................................ 2023-143463

(51) Int. Cl.
*B41J 2/045* (2006.01)

(52) U.S. Cl.
CPC ....... *B41J 2/04581* (2013.01); *B41J 2/04548* (2013.01); *B41J 2/0455* (2013.01)

(58) Field of Classification Search
CPC .. B41J 2/04581; B41J 2/04548; B41J 2/0455; B41J 2/04588; B41J 2/17596; H10N 30/802
See application file for complete search history.

(56) References Cited

FOREIGN PATENT DOCUMENTS

| | | | | |
|---|---|---|---|---|
| CN | 1235409 A | * 11/1999 | | H03K 4/00 |
| JP | 2012-110186 A | 6/2012 | | |

OTHER PUBLICATIONS

Narai, Kyooichi, “Piezoelectric Driving Circuit” (CN 1235409 A), Nov. 17, 1999, [Abstract, Second Embodiment, Fig. 9] (Year: 1999).*

* cited by examiner

*Primary Examiner* — Lisa Solomon
(74) *Attorney, Agent, or Firm* — VENABLE LLP

(57) ABSTRACT

A piezoelectric element driving circuit includes: a power supply including a positive electrode outputting a positive voltage and a negative electrode outputting a negative voltage; first and third switching elements including input terminals connected to the positive electrode; second and fourth switching elements including input terminals connected to the negative electrode; a first resistor connecting an output terminal of the first switching element and a first end of the piezoelectric element; a second resistor connecting the first end and an output terminal of the second switching element; a third resistor connecting an output terminal of the third switching element and a second end of the piezoelectric element; a fourth resistor connecting the second end and an output terminal of the fourth switching element, and a controller supplying a first control signal to the first and second switching elements and a second control signal to the third and fourth switching elements.

19 Claims, 10 Drawing Sheets

DRIVING CIRCUIT AND PRINTING APPARATUS

BACKGROUND OF THE INVENTION

Field of the Invention

The present disclosure relates to a technique of a driving circuit that drives a piezoelectric element.

Description of the Related Art

In the large format ink jet market, there are various applications of outputted products such as a CAD diagram, a poster, and an art piece. Therefore, inks of various types of physical properties are used for the applications. Depending on the physical properties of the ink, there occurs a problem such as image quality reduction due to precipitation. To deal with this, in some cases, an ink circulation pump is provided in an ink tank or in a printing head to prevent the precipitation of the ink. Particularly, an ink circulation pump using a piezoelectric element as a driving source is often provided as the ink circulation pump in the printing head because of its light weight. It is common to use a half bridge circuit with a single power supply as a driving circuit of the piezoelectric element. In a case of driving the piezoelectric element with a high voltage, a full bridge circuit (an H bridge circuit) with a single power supply may be used. Japanese Patent Laid-Open No. 2012-110186 discloses a technique of suppressing vibration of a voltage, which is generated in one end of a piezoelectric element, in a case where the piezoelectric element is driven by a full bridge circuit with a single power supply. In this case, the other end of the piezoelectric element is served as a reference of one end of the piezoelectric element.

SUMMARY OF THE INVENTION

A driving circuit according to the present disclosure is a driving circuit configured to drive a piezoelectric element including a first end and a second end, including: a power supply including a positive electrode configured to output a positive voltage and a negative electrode configured to output a negative voltage; a first switching element and a third switching element including input terminals connected to the positive electrode of the power supply; a second switching element and a fourth switching element including input terminals connected to the negative electrode of the power supply; a first resistor configured to connect an output terminal of the first switching element and the first end of the piezoelectric element; a second resistor configured to connect the first end of the piezoelectric element and an output terminal of the second switching element; a third resistor configured to connect an output terminal of the third switching element and the second end of the piezoelectric element; a fourth resistor configured to connect the second end of the piezoelectric element and an output terminal of the fourth switching element; and a control unit configured to supply a first control signal to a control terminal of the first switching element and a control terminal of the second switching element and supply a second control signal, which is an opposite phase signal of the first control signal, to a control terminal of the third switching element and a control terminal of the fourth switching element.

Further features of the present disclosure will become apparent from the following description of exemplary embodiments with reference to the attached drawings.

DESCRIPTION OF THE EMBODIMENTS

Figure 1:
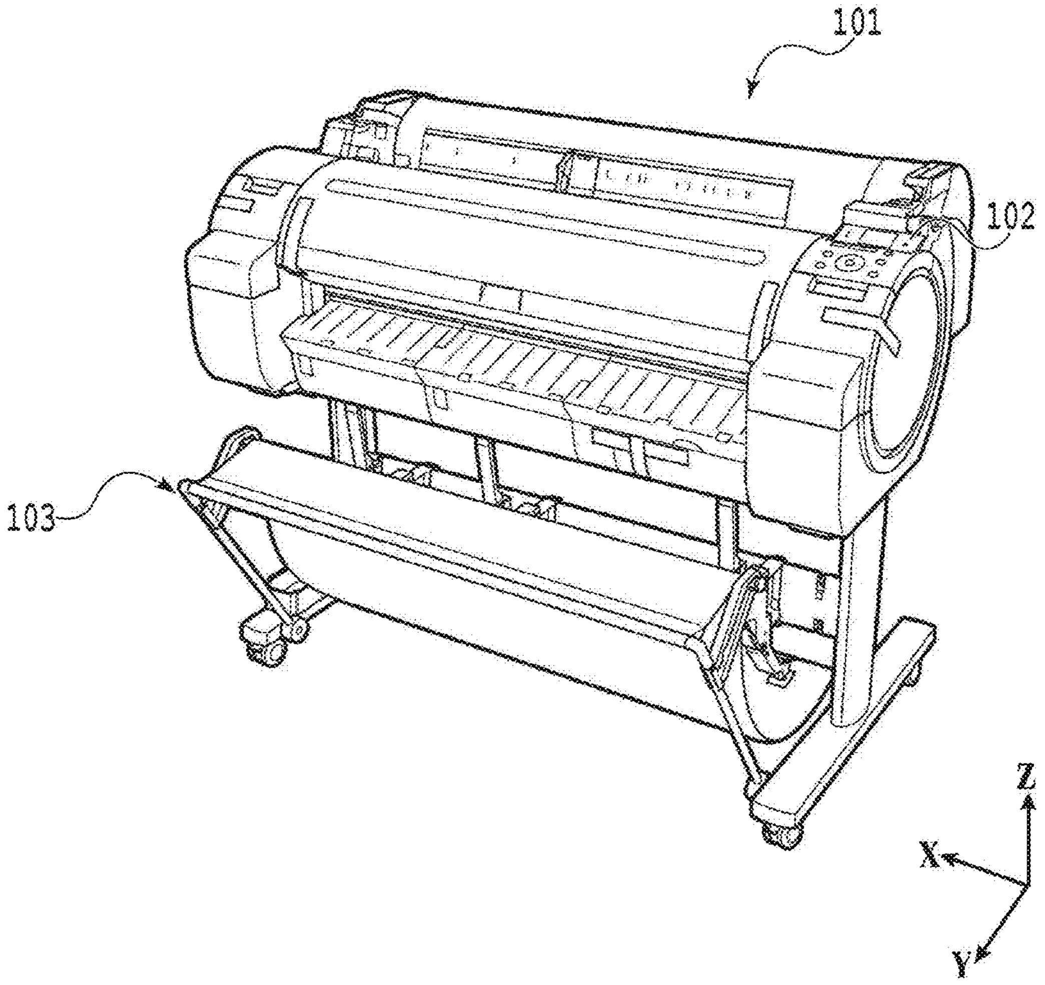
FIG. 1 is a schematic perspective view illustrating an appearance of a printing apparatus.

Hereinafter, with reference to the attached drawings, the present disclosure is explained in detail in accordance with preferred embodiments. Configurations shown in the following embodiments are merely exemplary and the present disclosure is not limited to the configurations shown schematically. In addition, the same components are denoted by the same reference numerals. Relative arrangements, shapes, and the like of components described in the present exemplary embodiment are each merely an example, and the scope of the present disclosure is not intended to be limited to such examples.

Note that, in the following descriptions of embodiments, "printing" involves not only a case of forming significant information, such as a character and a graphic, but widely involves a case of forming an image, a design, a pattern, and the like on a sheet. Additionally, although a roll sheet is assumed as the sheet in the embodiments below, the sheet may be cut paper, cloth, a plastic film, and the like. In addition, "ink" (also referred to as a "liquid") should be construed widely, and the ink indicates a liquid that can be applied onto the sheet for formation of an image, a design, a pattern, and the like, processing of the sheet, or processing of the ink.

First Embodiment

<Ink Jet Printing Apparatus>

Figure 2:
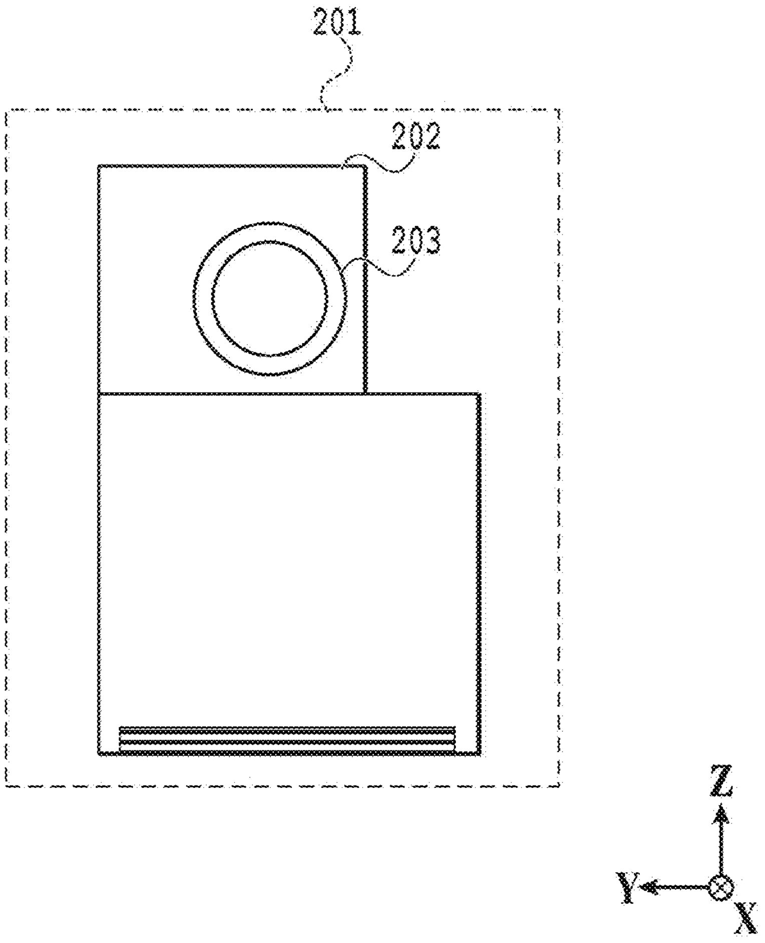
FIG. 2 is a cross-sectional view illustrating a configuration of a printing head.
Figure 3:
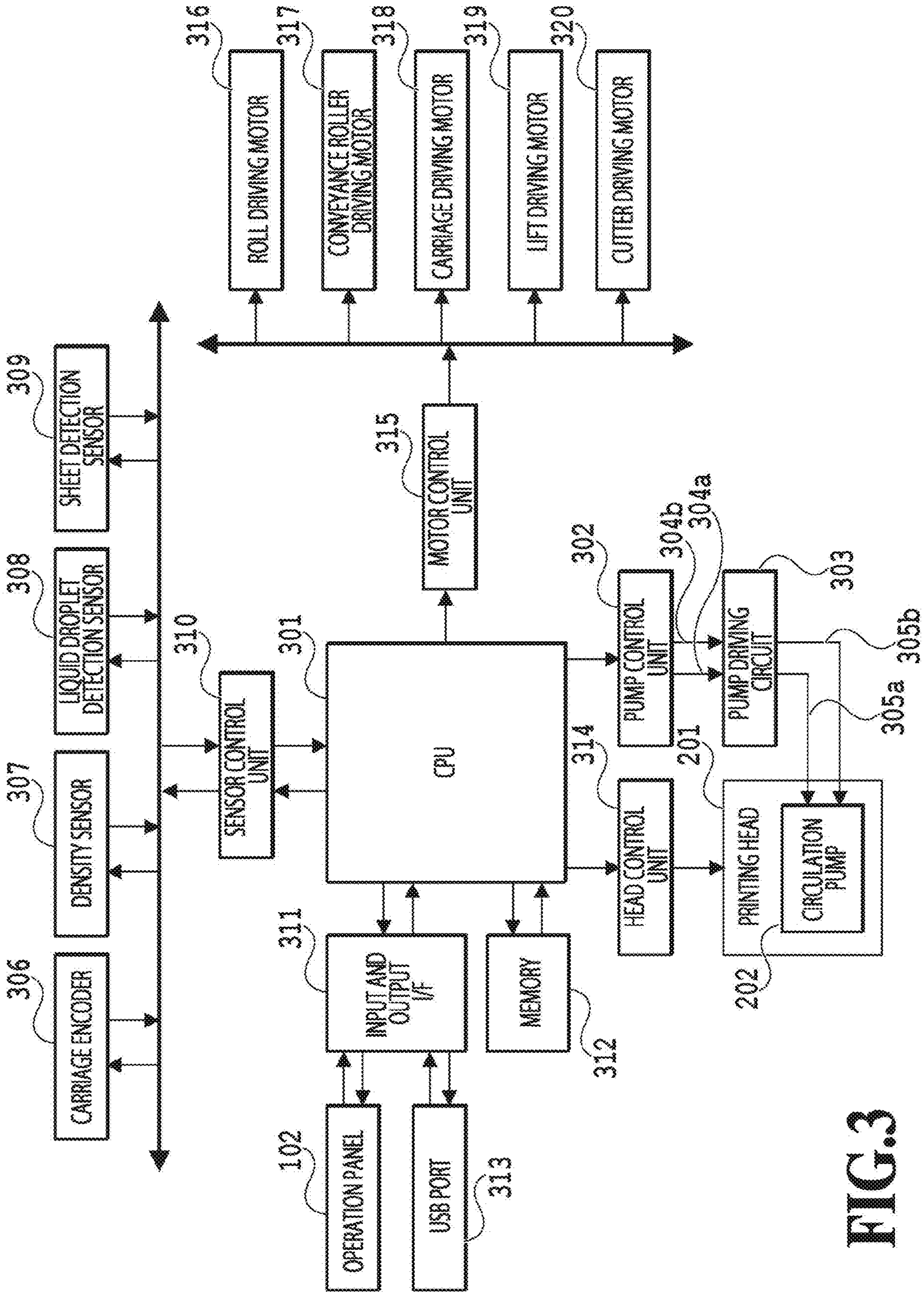
FIG. 3 is a block diagram illustrating a control configuration of the printing apparatus.

An ink jet printing apparatus 101 of the present embodiment is described with reference to FIGS. 1 to 3. FIG. 1 is a schematic perspective view of the printing apparatus 101. FIG. 2 is a cross-sectional view illustrating a configuration of the printing apparatus 101. FIG. 3 is a block diagram illustrating a control configuration of the printing apparatus 101.

The printing apparatus 101 rotatably holds a roll sheet R, which is a sheet S wound into the form of a roll. The sheet S is supplied from the roll sheet R to a not-illustrated conveyance roller by rotating the roll sheet R by a roll driving motor 316. The conveyance roller is rotated while pinching the sheet S. The sheet S is conveyed to a position in which a printing head 201 can perform printing on the sheet S by rotating the conveyance roller by a conveyance roller driving motor 317. An image is printed by ejecting a liquid (ink) from the printing head 201 onto the conveyed sheet S while moving the printing head 201 in an X direction. The sheet S on which the image is printed is discharged by a discharge unit which is disposed at downstream of the printing head 201 in a conveyance direction.

An operation panel 102 is an interface module that receives various operations from a user. The user uses various switches and the like included in the operation panel 102 to make various types of setting of the printing apparatus 101. The various types of setting of the printing apparatus 101 correspond to, for example, setting of a size and a type of the sheet S, a driving frequency of a circulation pump 202 included in the printing head 201, and the like.

In the conveyance direction, a sheet detection sensor 309 is arranged upstream of the conveyance roller. In a case where the sheet detection sensor 309 detects that the user supplies the sheet S from the roll sheet R, the conveyance operation of the sheet S is started. The conveyance of the sheet S is executed by synchronizing the roll driving motor 316 and the conveyance roller driving motor 317. In the image printing onto the sheet S, a conveyance operation to convey the sheet S to a position facing the printing head 201 is executed first. Next, a printing operation to scan the printing head 201 in a crossing direction crossing (perpendicular to) the conveyance direction of the sheet S while ejecting the liquid is executed. A desired image is printed on the sheet S by executing the conveyance operation of the sheet S and the printing operation of the image alternately. The sheet S on which the image is printed is sequentially conveyed to downstream of the printing head 201 in the conveyance direction. The conveyed sheet S is cut by a cutter included in the discharge unit. The cut sheet S is stacked in a basket 103.

FIG. 3 is a block diagram illustrating a control configuration of the printing apparatus 101. A motor control unit 315 controls the roll driving motor 316, the conveyance roller driving motor 317, a carriage driving motor 318, a lift driving motor 319, and a cutter driving motor 320 according to a control program stored in a memory 312. The conveyance roller driving motor 317 rotates the conveyance roller, and the roll driving motor 316 rotates a spool. An encoder that detects a rotation amount for detecting a conveyance amount of the sheet S is provided to the conveyance roller driving motor 317. The carriage driving motor 318 moves a not-illustrated carriage and the printing head 201 mounted on the carriage by rotating a not-illustrated carriage belt.

Various types of setting information and the like based on the user operation from the operation panel 102 or an external PC connected to a USB port 313 are inputted to a CPU 301 via an input and output I/F 311. The inputted information is saved in the memory 312. The CPU 301 reads out the information saved in the memory 312 as needed and executes various types of processing based on the read out information. That is, the CPU 301 includes a processing unit that executes the various types of processing.

The CPU 301 obtains information by controlling a carriage encoder 306, a density sensor 307, a liquid droplet detection sensor 308, and the sheet detection sensor 309 via a sensor control unit 310. The CPU 301 executes various types of control based on inputs from the carriage encoder 306, the density sensor 307, the liquid droplet detection sensor 308, and the sheet detection sensor 309.

<Control of Circulation Pump>

The circulation pump 202 that circulates the liquid in the printing head 201 is mounted on the printing head 201. A piezoelectric element 203 that converts electric energy into mechanical energy is provided to the circulation pump 202. In a case where a voltage is applied between terminals of the piezoelectric element 203, a distortion proportional to the applied voltage is generated by the electrostrictive effect. With use of this distortion, a not-illustrated diaphragm included in the circulation pump 202 is vibrated, and thus the liquid in the printing head 201 is circulated. As the driving voltage applied to the piezoelectric element 203, a square wave or a sinusoidal wave is generally used.

The CPU 301 provides a pump control unit 302 with an instruction related to the driving of the circulation pump 202. The instruction corresponds to, for example, driving start, driving end, a driving frequency, and the like. A communication method to provide the instruction may be, for example, I2C, SPI, and the like. The pump control unit 302 inputs a control signal 304*a* and a control signal 304*b* according to the instruction to a pump driving circuit 303. As the pump control unit 302, for example, an FPGA, a microcomputer, or the like is used. The control signal 304*a* and the control signal 304*b* may be, for example, a square wave, a sinusoidal wave, or the like. The pump driving circuit 303 applies a driving voltage 305*a* and a driving voltage 305*b* according to the control signal 304*a* and the control signal 304*b* to the circulation pump 202.

<Basic Operation of Pump Driving Circuit>

Figure 4:
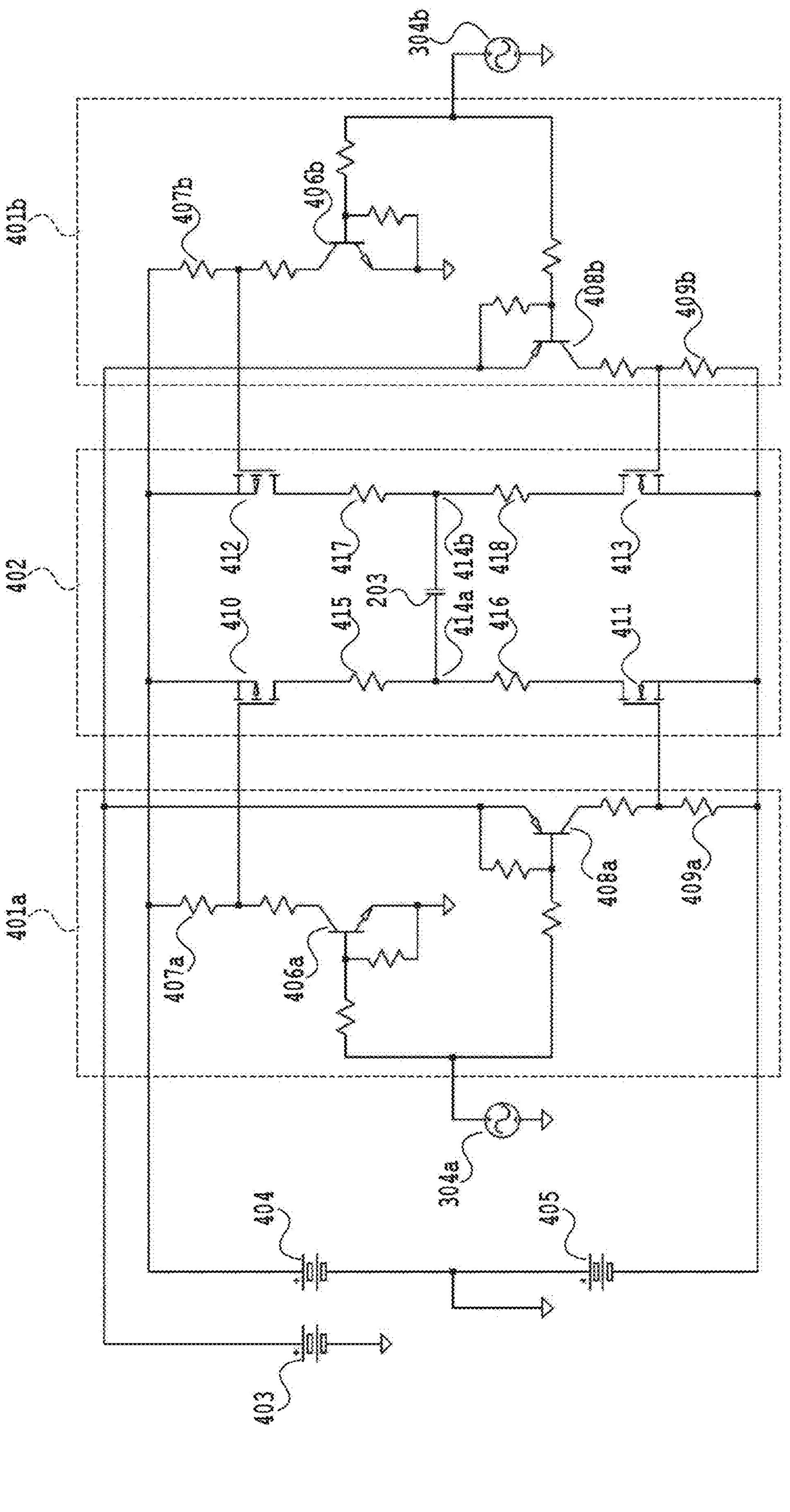
FIG. 4 is a circuit diagram illustrating a pump driving circuit.
Figure 5A:
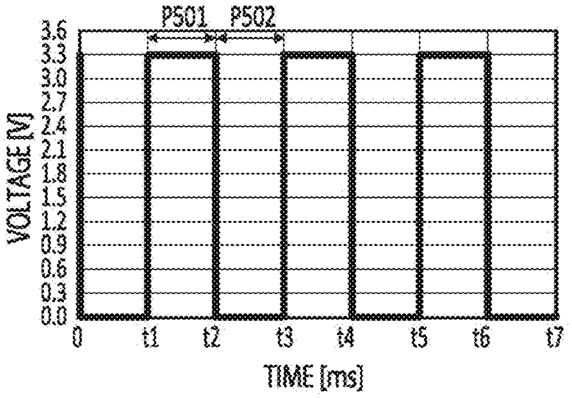
FIGS. 5A, 5B, 5C, 5D, and 5E are diagrams illustrating a voltage waveform of input and output of the pump driving circuit.
Figure 5B:
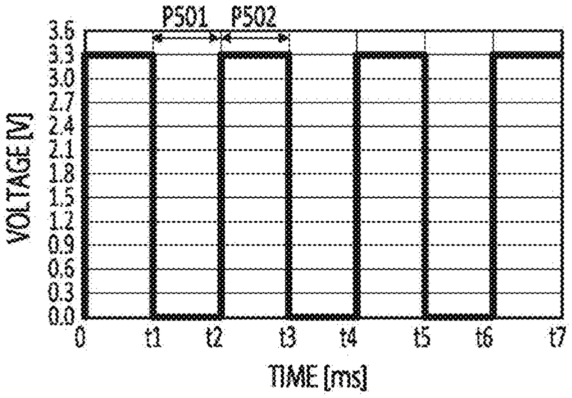

FIG. 4 is a circuit diagram illustrating the pump driving circuit 303. The control signals 304*a* and 304*b* outputted from the pump control unit 302 drives a full bridge circuit 402 via gate drivers 401*a* and 401*b* and applies the driving voltages 305*a* and 305*b* to the piezoelectric element 203 included in the circulation pump 202. The control signal 304*a* (a first control signal) and the control signal 304*b* (a second control signal) are a square wave with an amplitude of 3.3 V. As described above, a sinusoidal e wave may be used for the control signal 304*a* and the control signal 304*b*. The control signal 304*a* and the control signal 304*b* have a relationship of opposite phase. A voltage waveform of the control signal 304*a* is illustrated in FIG. 5A, and a voltage waveform of the control signal 304*b* is illustrated in FIG. 5B. In a period P501 from time t1 to time t2, the control signal 304*a* is 3.3 V, and the control signal 304*b* is 0 V. In a period P502 from the time t2 to time t3, the control signal 304*a* is 0 V, and the control signal 304*b* is 3.3 V. After the time t3, the control signal 304*a* and the control signal 304*b* repeat the states of the period P501 and the period P502. For the sake of convenience, the state in which the control signal 304*a* and the control signal 304*b* are 3.3 V is called a state in which the control signal 304*a* and the control signal 304*b* are ON. Additionally, the state in which the control signal 304*a* and the control signal 304*b* are 0 V is called a state in which the control signal 304*a* and the control signal 304*b* are OFF. The behaviors of the circuit in the period P501 and the period P502 show a result that outputs of a transistor and a MOSFET are inverted. Therefore, hereinafter, only the behavior of the circuit in the period P501 is explained, and for the behavior of the circuit in the period P502, only the voltage waveform is explained.

The gate driver 401*a* is connected with a +3.3 V power supply 403, a +35 V power supply 404 (a first power supply), a −35 V power supply 405 (a second power supply), the control signal 304*a*, and the full bridge circuit 402. The gate driver 401*b* is connected with the +3.3 V power supply 403, the +35 V power supply 404 (the first power supply), the −35 V power supply 405 (the second power supply), the control signal 304*b*, and the full bridge circuit 402. Although the +35 V power supply 404 and the −35 V power supply 405 are different power supplies in the present embodiment, a single power supply that outputs +35 V (a positive voltage) from a positive electrode and outputs −35 V (a negative voltage) from a negative electrode may be used. Additionally, the gate driver 401*a* includes an npn transistor 406*a*, a pnp transistor 408*a*, and plural resistors. The gate driver 401*b* includes an npn transistor 406*b*, a pnp transistor 408*b*, and plural resistors.

An emitter of the npn transistor 406*a* is connected to a GND, and a collector thereof is connected to the +35 V power supply 404 via a resistor 407*a*. An emitter of the pnp transistor 408*a* is connected to the +3.3 V power supply 403, and a collector thereof is connected to the −35 V power supply 405 via a resistor 409*a*. The control signal 304*a* is inputted to a base of the npn transistor 406*a* and a base of the pnp transistor 408*a*. An emitter of the npn transistor 406*b* is connected to a GND, and a collector thereof is connected to the +35 V power supply 404 via a resistor 407*b*. An emitter of the pnp transistor 408*b* is connected to the +3.3 V power supply 403, and a collector thereof is connected to the −35 V power supply 405 via a resistor 409*b*. The control signal 304*b* is inputted to a base of the npn transistor 406*b* and a base of the pnp transistor 408*b*.

In the period P501, 3.3 V is applied to the base of the npn transistor 406*a* of the gate driver 401*a* via a resistor. Thus, a voltage between the base and the emitter of the npn transistor 406*a* becomes higher than 0.7 V, and the collector and the emitter of the npn transistor 406*a* are electrically connected to each other. With the electrical connection between the collector and the emitter, a collector current flows. A voltage drop in the resistor 407*a* becomes higher than 1.5 V of a gate threshold voltage of a P-MOSFET 410 (a first switching element) of the full bridge circuit 402, and a drain and a source of the P-MOSFET 410 are electrically connected to each other.

Likewise, 3.3 V is applied to also the base of the pnp transistor 408*a* via a resistor. Thus, a voltage between the base and the emitter of the pnp transistor 408*a* becomes lower than 0.7 V, and the collector and the emitter of the pnp transistor 408*a* are not electrically connected to each other. Since the collector and the emitter are not electrically connected to each other, no collector current flows. Therefore, no voltage drop occurs in the resistor 409*a*. The voltage drop in the resistor 409*a* is lower than 1.5 V of a gate threshold voltage of an N-MOSFET 411 (a second switching element) of the full bridge circuit 402, and a drain and a source of the N-MOSFET 411 are not electrically connected to each other.

Hereinafter, for the sake of convenience, a state in which the collector and the emitter of the transistor are electrically connected to each other is called that the transistor is turned ON, and a state in which the collector and the emitter are not electrically connected to each other is called that the transistor is turned OFF. Likewise, a state in which the drain and the source of the MOSFET are electrically connected to each other is called that the MOSFET is turned ON, and a state in which the drain and the source are not electrically connected to each other is called that the MOSFET is turned OFF.

As with the gate driver 401*a*, in the period P501, the npn transistor 406*b* of the gate driver 401*b* is turned OFF, and a P-MOSFET 412 (a third switching element) is turned OFF. The pnp transistor 408*b* is turned ON, and an N-MOSFET 413 (a fourth switching element) is turned ON.

The full bridge circuit 402 is connected with the +35 V power supply 404, the −35 V power supply 405, and the gate driver 401*a* and the gate driver 401*b*. In addition, the piezoelectric element 203 included in the circulation pump 202 is connected between output terminals 414*a* and 414*b* of the full bridge circuit 402 as a load. Additionally, the full bridge circuit 402 includes the P-MOSFET 410, the N-MOSFET 411, the P-MOSFET 412, the N-MOSFET 413, a resistor 415 (a first resistor), a resistor 416 (a second resistor), a resistor 417 (a third resistor), and a resistor 418 (a fourth resistor). The source (an input terminal) of the P-MOSFET 410 is connected to the +35 V power supply 404, and the drain (an output terminal) thereof is connected to the resistor 415. The source of the N-MOSFET 411 is connected to a GND, and the drain thereof is connected to the resistor 416. The source of the P-MOSFET 412 is connected o the +35 V power supply 404, and the drain thereof is connected to the resistor 417. The source of the N-MOSFET 413 is connected to the GND, and the drain thereof is connected to the resistor 418. The output of the gate driver 401*a* is inputted to a gate (a control terminal) of each of the P-MOSFET 410 and the N-MOSFET 411. The output of the gate driver 401*b* is inputted to a gate of each of the P-MOSFET 412 and the N-MOSFET 413. The resistor 415 and the resistor 416 are connected to the output terminal 414*a* of the full bridge circuit 402, and the resistor 417 and resistor 418 are connected to the output terminal 414*b* of the full bridge circuit 402. The output terminal 414*a* of the full bridge circuit 402 is a first end of the piezoelectric element 203. The output terminal 414*b* of the full bridge circuit 402 is a second end of the piezoelectric element 203.

Figure 5C:
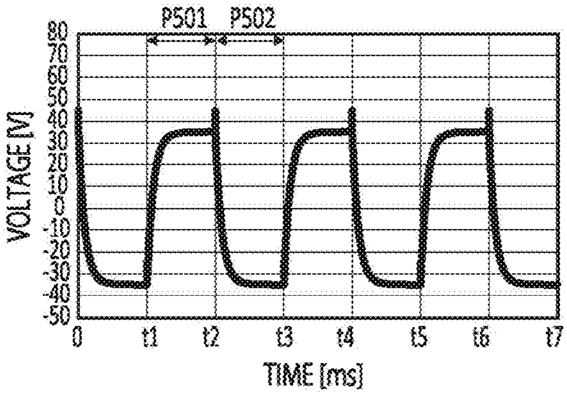
Figure 5D:
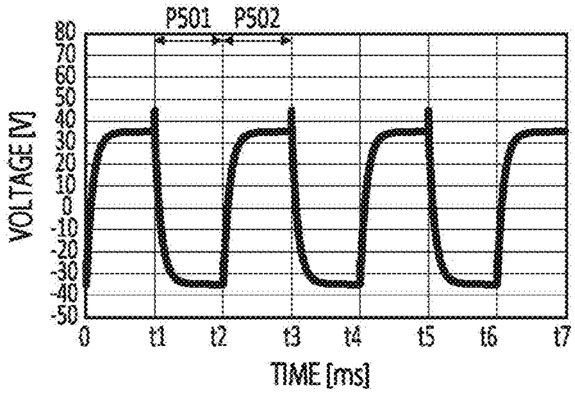
Figure 5E:
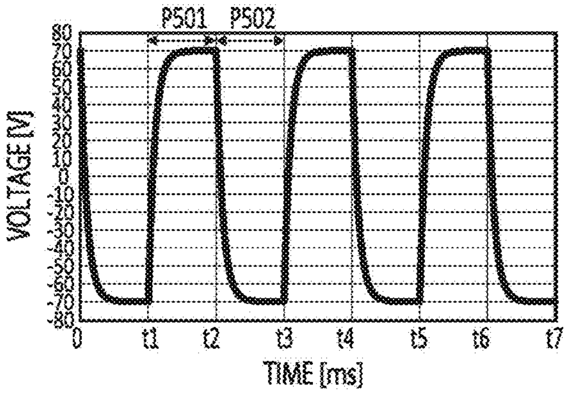

In the period P501, as mentioned in the descriptions of the operations of the gate driver 401*a* and the gate driver 401*b*, the P-MOSFET 410 is turned ON, the N-MOSFET 411 is turned OFF, the P-MOSFET 412 is turned OFF, and the N-MOSFET 413 is turned ON. The output terminal 414*a* of the full bridge circuit 402 is connected to the +35 V power supply 404 via the P-MOSFET 410 and the resistor 415. The output terminal 414*b* of the full bridge circuit 402 is connected to the −35 V power supply 405 via the N-MOSFET 413 and the resistor 418. The piezoelectric element 203 is a capacitive load; for this reason, the piezoelectric element 203 has properties to accumulate charges like a capacitor. Accordingly, in the period P501, the voltage of the output terminal 414*a* gradually increases to +35 V, and the voltage of the output terminal 414*b* gradually decreases to −35 V. A voltage waveform of the output terminal 414*a* is illustrated in FIG. 5C, and a voltage waveform of the output terminal 414*b* is illustrated in FIG. 5D. The voltage applied to the piezoelectric element 203 included in the circulation pump 202 is the voltage of the output terminal 414*a* based on the output terminal 414*b*. For the sake of convenience, the voltage applied to the piezoelectric element 203 included in the circulation pump 202 is called a circulation pump voltage. A voltage waveform of the circulation pump voltage is illustrated in FIG. 5E.

As above, in the period P501, the circulation pump voltage of +70 V is applied to the piezoelectric element 203 included in the circulation pump 202. In the period P502, ON and OFF of the transistors included in the gate driver 401*a* and the gate driver 401*b* and the MOSFETs included in the full bridge circuit 402 are all inverted, and the circulation pump voltage becomes −70 V. With the alternate switching between the state of the period P501 and the state of the period P502, it is possible to apply the circulation pump voltage of the peak to peak of 140 V to the piezoelectric element 203. Thus, it is possible to circulate the liquid in the printing head 201 by the circulation pump 202 and to prevent image deterioration and the like due to precipitation of the ink, for example.

<Role of Resistor Included in Full Bridge Circuit>

The resistor 415, the resistor 416, the resistor 417, and the resistor 418 included in the full bridge circuit 402 roughly have three roles.

A first role is to moderate the driving voltage 305*a* and the driving voltage 305*b* of the circulation pump 202. In a case where the applied voltage is steeply changed, the piezoelectric element 203 used in the circulation pump 202 is greatly damaged, and the durability as the circulation pump 202 is reduced. Additionally, the steep change may cause a loud buzzer sound from the piezoelectric element 203. Since the piezoelectric element 203 is a capacitive load, it is possible to handle the piezoelectric element 203 as a capacitor in terms of an electric circuit. It is possible to form an RC circuit by providing a resistor in a charge and discharge path of the piezoelectric element 203 and suppress the steep change of the applied voltage. As illustrated in FIGS. 5A and 5B, the control signal 304*a* and the control signal 304*b* are square waves and have a steep voltage change. However, as illustrated in FIGS. 5C and 5D, the waveforms of the driving voltage 305*a* and the driving voltage 305*b* are moderate. Likewise, the circulation pump voltage illustrated in FIG. 5E is also moderate, and it can be understood that the steep change of the voltage applied to the piezoelectric element 203 included in the circulation pump 202 is suppressed.

In a case where the piezoelectric element 203 is treated as a capacitor, driving of the circulation pump 202 is equivalent to charging and discharging of a capacitor. The voltage between terminals of the capacitor is equivalent to the voltage applied to the circulation pump 202, that is, equivalent to the circulation pump voltage, and can be expressed by the following expressions.

$$V_C = (V_{CC} - V_{EE}) \times \left(1 - e^{-\frac{1}{RC}t}\right) \quad \text{(Expression (1))}$$

$$V_C = (V_{CC} - V_{EE}) \times e^{-\frac{1}{RC}t} \quad \text{(Expression (2))}$$

Expression (1) expresses charging, and Expression (2) expresses discharging. $V_C$ is the circulation pump voltage. $V_{CC}$ is a voltage value of the +35 V power supply 404. $V_{EE}$ is a voltage value of the −35 V power supply 405. R is a composite resistance value of the charge and discharge path. C is an electrostatic capacitance that the piezoelectric element 203 has. The following four types may be considered as the charge and discharge path. A first path is a path in which the P-MOSFET 410 and the N-MOSFET 413 are turned ON, and a current flows to the resistor 415 and the resistor 418. A second path is a path in which the P-MOSFET 412 and the N-MOSFET 411 are turned ON, and a current flows to the resistor 417 and the resistor 416. A third path is a path in which the P-MOSFET 410 and the P-MOSFET 412 are turned ON, and a current flows to the resistor 415 and the resistor 417. A fourth path is a path in which the N-MOSFET 411 and the N-MOSFET 413 are turned ON, and a current flows to the resistor 416 and the resistor 418. These four paths can be controlled by the combination of the control signal 304*a* and the control signal 304*b*.

The voltage waveform illustrated in each of FIGS. 5A to 5E is a waveform repeating the first path and the second path. The resistor 415, the resistor 416, the resistor 417, and the resistor 418 all have the same resistance value. As the resistance value is increased, the driving voltage 305*a* and the driving voltage 305*b* are further distorted, and the circulation pump voltage has a waveform further moderated. As the resistance value is decreased, the distortion of the driving voltage 305*a* and the driving voltage 305*b* is reduced, and the waveform of the circulation pump voltage becomes steep. It is possible to flexibly change the properties of the driving voltage 305*a* and the driving voltage 305*b* of the circulation pump 202 by adjusting the combination of the control signal 304*a* and the control signal 304*b* and the resistance value that each resistor has. As a result, it is possible to flexibly change the circulation pump voltage.

A second role is to limit a flow-through current. In the full bridge circuit 402, the P-MOSFET 410 and the N-MOSFET 411 are controlled by the control signal 304*a*. Likewise, the P-MOSFET 412 and the N-MOSFET 413 are controlled by the control signal 304*b*. The full bridge circuit 402 has a configuration in which the P-MOSFET and the N-MOSFET drive exclusively. However, depending on the individual variability of the transistors included in the gate driver 401*a* and the gate driver 401*b* and the individual variability of the MOSFETs included in the full bridge circuit 402, the P-MOSFET and the N-MOSFET are turned ON concurrently in some cases. For example, in a case where the P-MOSFET 410 and the N-MOSFET 411 are turned ON concurrently, the +35 V power supply 404 is connected to the −35 V power supply 405 via the resistor 415 and the resistor 416. In a case where there are no resistor 415 and resistor 416, the +35 V power supply 404 and the −35 V power supply 405 are short-circuited, and a high current flows as a flow-through current. Thus, there is a possibility of occurrence of a false operation of the element or a breakdown of the element or destruction of the circuit, for example. The resistor 415 and the resistor 416, and the resistor 417 and the resistor 418 can limit the above-described flow-through current.

A third role is to limit an overcurrent in a case where the circulation pump 202 has a breakdown, and the output terminals 414*a* and 414*b* of the full bridge circuit 402 are short-circuited. A short circuit of the piezoelectric element 203 may be considered as a breakdown of the circulation pump 202. For example, in the period P501, the +35 V power supply 404 is connected to the −35 V power supply 405 via the resistor 415, the piezoelectric element 203, and the resistor 418. In a case where the piezoelectric element 203 included in the circulation pump 202 is short-circuited, if there are no resistors, the +35 V power supply 404 and the −35 V power supply 405 are short-circuited, and a high current flows. The resistor 415 and the resistor 418, and the resistor 417 and the resistor 416 can limit the above-mentioned high current.

With use of the pump driving circuit 303 of the present embodiment, it is possible to drive the circulation pump 202 with two power supplies. Additionally, it is possible to decrease more the maximum voltage of the entire circuit including a peripheral circuit and to reduce more the withstand voltage of a used element than a case of driving with a single power supply. Thus, it is possible to make designing of the pump driving circuit 303 easy. As an additional effect, it is also possible to reduce the cost. Additionally, in the pump driving circuit 303, it is also possible to flexibly change the driving voltage 305*a* and the driving voltage 305*b* by adjusting the control signal 304*a*, the control signal 304*b*, and the values of the resistors included in the full bridge circuit 402. As a result, it is also possible to flexibly change the circulation pump voltage.

Note that, the number of the control signals from the pump control unit 302 is not limited to two. The number of the pump driving circuit controlled by the pump control unit 302 is not limited to one. Accordingly, plural pump driving circuits 303 may be controlled by a single pump control unit 302. Plural circulation pumps 202 or plural piezoelectric elements 203 included in the circulation pumps 202 may be driven by the single pump driving circuit 303. Although an example in which the switching elements included in the full bridge circuit 402 are the P-MOSFET on a high side and the N-MOSFET on a low side is described, it is not limited thereto. The N-MOSFET may be used on the high side, and the P-MOSFET may be used on the low side. The pnp transistor may be used on the high side, and the npn transistor may be used on the low side. The npn transistor may be used on the high side, and the pnp transistor may be used on the low side. Additionally, instead of the MOSFET, a switching element such as a relay may be used.

With the above-described circuit configuration being employed, it is possible to reduce the maximum voltage of the entire circuit including the peripheral circuit and to reduce the withstand voltage of a used element. It is possible to use an element with low withstand voltage, and designing of the above-described pump driving circuit becomes easier.

Second Embodiment

In the first embodiment, as illustrated in FIGS. 5A and 5B, the control signal 304*a* and the control signal 304*b* are opposite phase signals and are not turned ON concurrently. Therefore, ideally, the P-MOSFET 410 and the P-MOSFET 412 on the high side or the N-MOSFET 411 and the N-MOSFET 413 on the low side included in the full bridge circuit 402 are not turned ON concurrently.

Figure 6A:
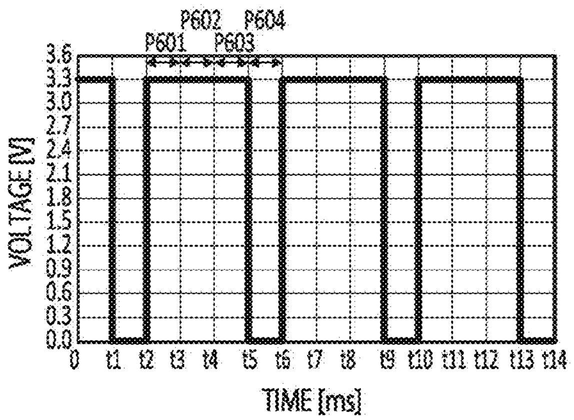
FIGS. 6A, 6B, 6C, 6D, and 6E are diagrams illustrating a voltage waveform of input and output of the pump driving circuit.
Figure 6B:
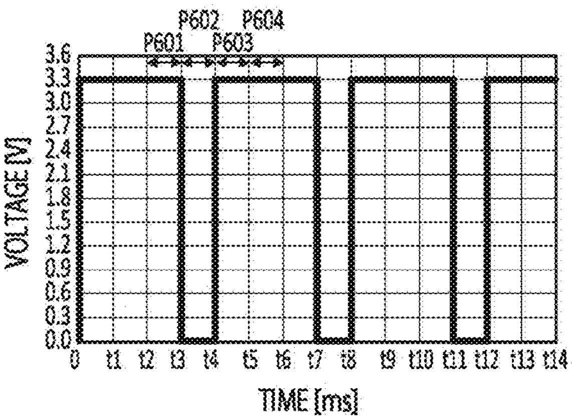

In the present embodiment, the driving voltage 305*a* and the driving voltage 305*b*, that is, the circulation pump voltage is changed in two stages between +70 V and −70 V by providing a period in which the control signal 304*a* and the control signal 304*b* are turned ON or turned OFF concurrently. In this case, the circulation pump voltage is changed from −70 V to 0 V in a first stage, and the circulation pump voltage is changed from 0 V to +70 V in a second stage. An operation of the pump driving circuit 303 in a case where the period in which the control signal 304*a* and the control signal 304*b* are turned ON concurrently is provided is described below. The control signal 304*a* is illustrated in FIG. 6A, and the control signal 304*b* is illustrated in FIG. 6B. In a period P601 from the time t2 to the time t3 and a period P603 from time t4 to time t5, both the control signal 304*a* and control signal 304*b* are turned ON. In a period P602 from the time t3 to the time t4 and a period P604 from the time t5 to time t6, the control signal 304*a* and the control signal 304*b* are in opposite phase and are inverted.

Figure 6C:
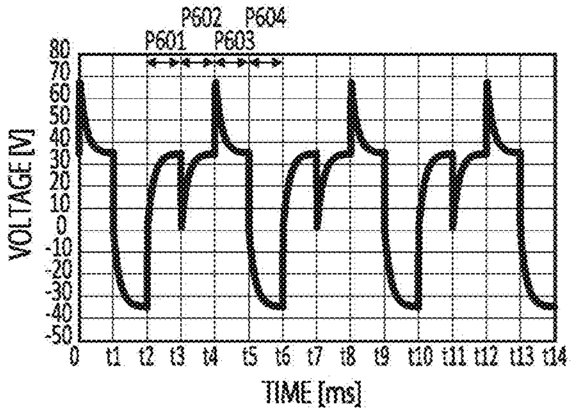
Figure 6D:
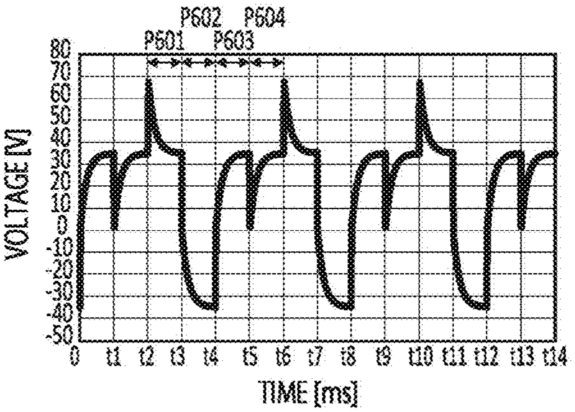

In the period P601, with the control signal 304*a* and the control signal 304*b* being turned ON, the P-MOSFET 410 and the P-MOSFET 412 are turned ON in the full bridge circuit 402. In this process, a loop including the +35 V power supply 404, the P-MOSFET 410, the resistor 415 (a fifth resistor), the piezoelectric element 203, the resistor 417 (a sixth resistor), and the P-MOSFET 412 is formed. Thus, the piezoelectric element 203 included in the circulation pump 202 is charged and discharged via the resistor 415 and the resistor 417 such that the voltage applied to the piezoelectric element 203 included in the circulation pump 202, that is, the circulation pump voltage becomes 0 V. A voltage waveform of the period P601 corresponds to the first stage of the above-mentioned two stages. In the period P602, a circuit operation is equivalent to that in the period P501 in the first embodiment. Accordingly, the piezoelectric element 203 included in the circulation pump 202 is charged and discharged via the resistor 415 and the resistor 418 such that the circulation pump voltage becomes +70 V. A voltage waveform of the period P602 corresponds to the second stage of the above-mentioned two stages. In the period P603, since the same loop as that in the period P601 is formed, the piezoelectric element 203 included in the circulation pump 202 is charged and discharged via the resistor 415 and the resistor 417 such that the circulation pump voltage becomes 0 V. A voltage waveform of the period P603 corresponds to the first stage of the above-mentioned two stages. In the period P604, a circuit operation is equivalent to that in the period P502 in the first embodiment. Accordingly, the piezoelectric element 203 included in the circulation pump 202 is charged and discharged via the resistor 417 and the resistor 416 such that the circulation pump voltage becomes −70 V. A voltage waveform of the period P604 corresponds to the second stage of the above-mentioned two stages. As above, it is possible to change the circulation pump voltage in the two stages from −70 V to +70 V and from +70 V to −70 V by providing the period in which both the control signal 304*a* and control signal 304*b* are turned ON. The voltage waveform of the output terminal 414*a* is illustrated in FIG. 6C, the voltage waveform of the output terminal 414*b* is illustrated in FIG. 6D, and the voltage waveform of the circulation pump voltage is illustrated in FIG. 6E.

Figure 6E:
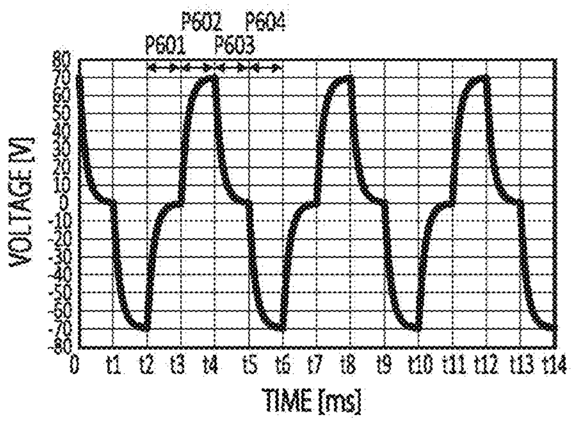
Figure 7A:
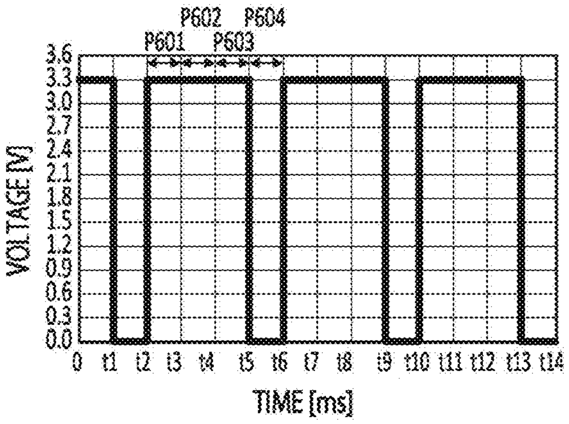
FIGS. 7A, 7B, 7C, 7D, 7E, and 7F are diagrams illustrating a voltage waveform of input and output of the pump driving circuit.
Figure 7B:
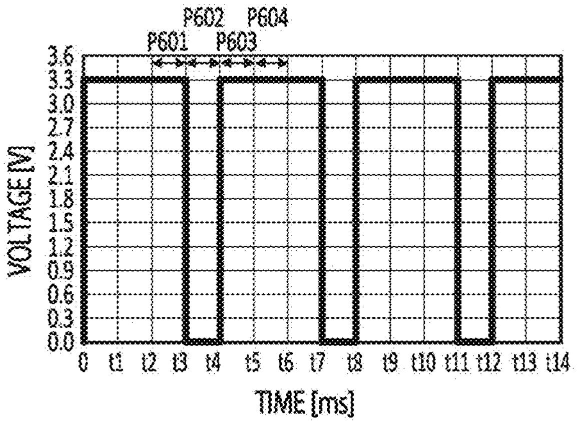
Figure 7C:
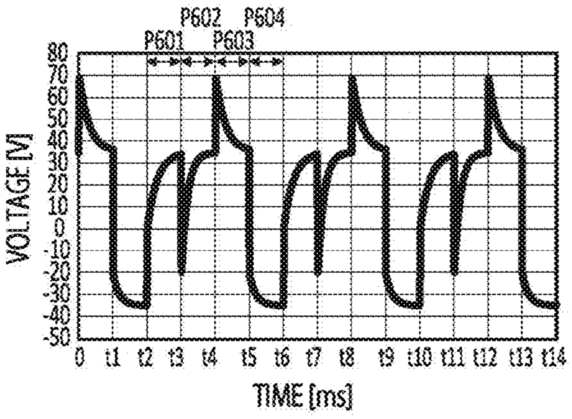
Figure 7D:
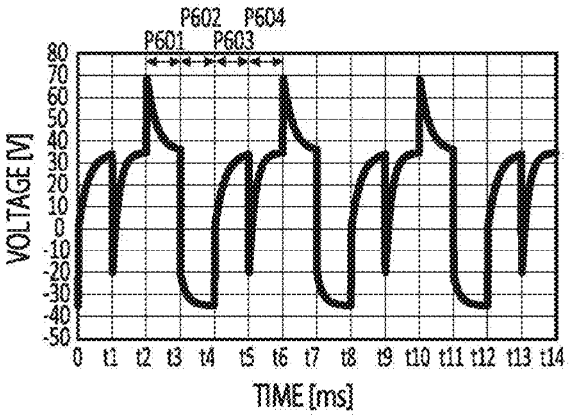
Figure 7E:
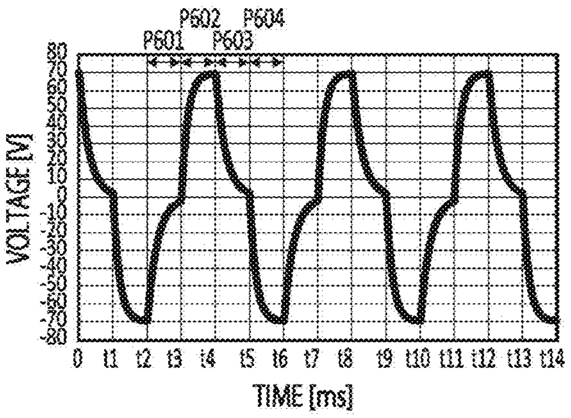
Figure 7F:
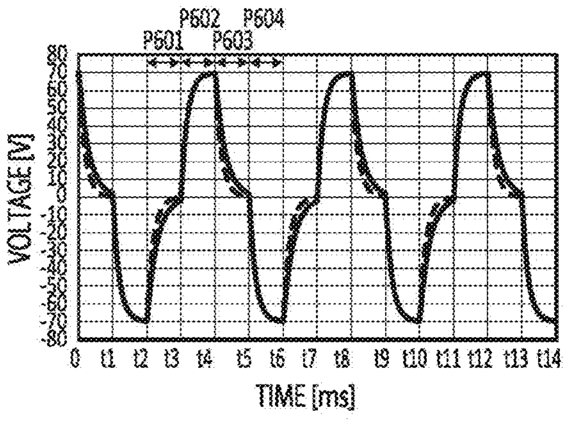

As with the first embodiment, the voltage waveforms illustrated in FIGS. 6A to 6E indicate a case where the resistor 415 and the resistor 417 on the high side and the resistor 416 and the resistor 418 on the low side all have the same resistance value. It is possible to change a rise time, a fall time, or the like in a case where the circulation pump voltage is changed in two stages by adjusting these resistance values. For example, FIG. 7E illustrates the circulation pump voltage in a case where the resistance value that the resistor 415 and the resistor 417 on the low side have is greater than the resistance value that the resistor 416 and the resistor 418 on the high side have. As illustrated in FIGS. 7A and 7B, the control signal 304*a* and the control signal 304*b* in this case are the same as the waveforms illustrated in FIGS. 6A and 6B. FIG. 7C illustrates the voltage waveform of the output terminal 414*a*, and FIG. 7D illustrates the voltage waveform of the output terminal 414*b*. In FIG. 7F, the circulation pump voltage in a case where all the resistance values illustrated in FIG. 6E are equal to each other is illustrated with a dotted line, and the circulation pump voltage in a case where the resistance value on the high side is greater than the resistance value on the low side is illustrated with a solid line. As the resistor 415 and the resistor 417 on the high side are increased, the resistance values on the charge and discharge path in the period P601 and the period P603 are increased; thus, the rise time or the fall time is extended, and the change of the circulation pump voltage is moderated.

Note that, although the resistance value on the high side is greater than the resistance value on the low side, and the period in which the control signal 304*a* and the control signal 304*b* are turned ON concurrently is provided in the present embodiment, it is not limited thereto. The resistance value on the low side may be greater than the resistance value on the high side. Additionally, the period in which the control signal 304*a* and the control signal 304*b* are turned OFF concurrently may be provided.

With the above-described circuit configuration being employed, it is possible to reduce the maximum voltage of the entire circuit including the peripheral circuit and to reduce the withstand voltage of a used element. In addition, with the above-described voltage application method being employed, it is possible to change the rise time or the fall time of the voltage applied to the piezoelectric element and also to suppress the steep voltage. Thus, it is possible to extend the life-span of a used element.

Third Embodiment

In the first embodiment, the full bridge circuit 402 includes the resistor 415, the resistor 416, the resistor 417, and the resistor 418. Additionally, in the first embodiment, it is described that these resistors have the three roles. The above-described three roles can be taken by only the resistor 415 and the resistor 417 on the high side or only the resistor 416 and the resistor 418 on the low side.

Figure 8:
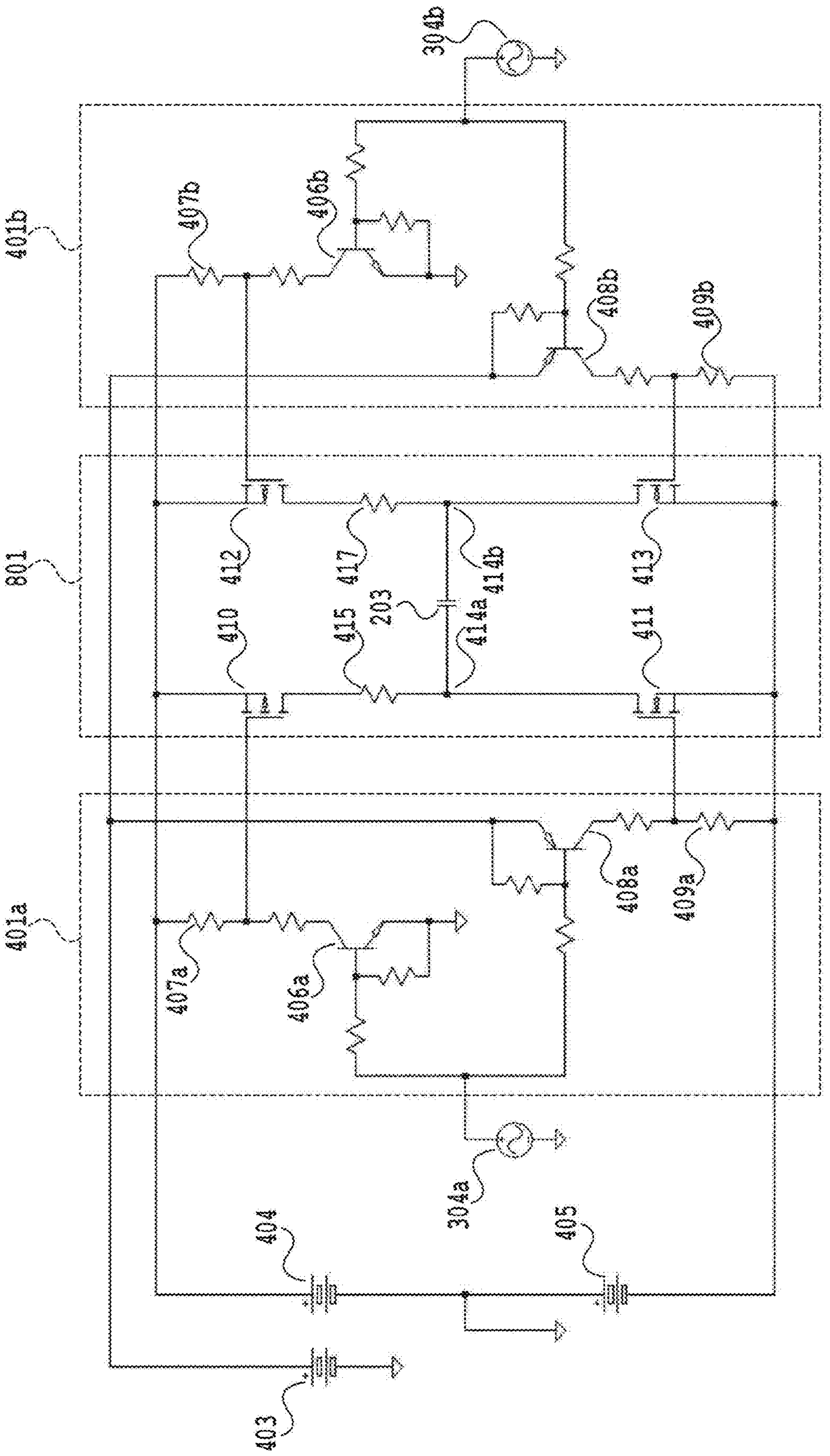
FIG. 8 is a circuit diagram illustrating the pump driving circuit.

In the present embodiment, a case where only the resistor 415 and the resistor 417 on the high side are arranged is described. FIG. 8 illustrates a circuit diagram of the pump driving circuit 303 including a full bridge circuit 801 on which only the resistor 415 and the resistor 417 on the high side are arranged.

Figure 9A:
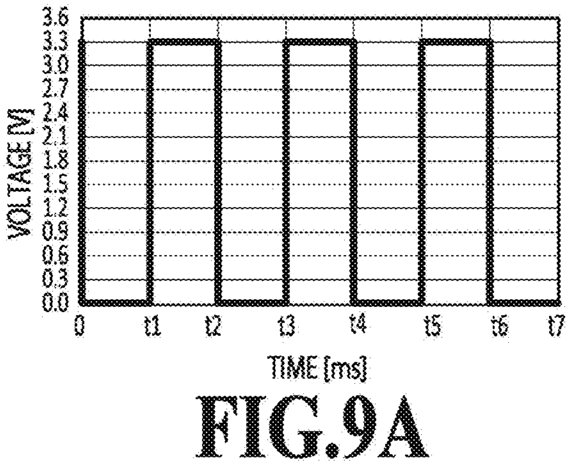
FIGS. 9A, 9B, 9C, 9D, and 9E are diagrams illustrating a voltage waveform of input and output of the pump driving circuit.
Figure 9B:
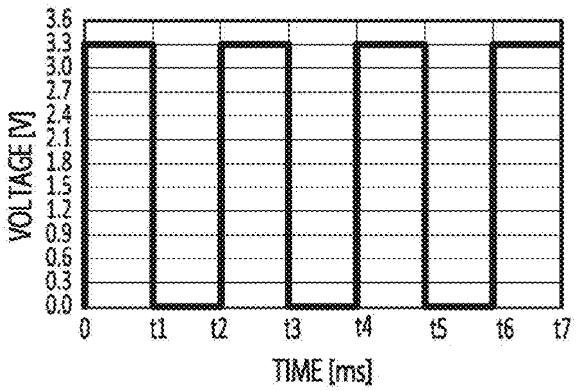
Figure 9C:
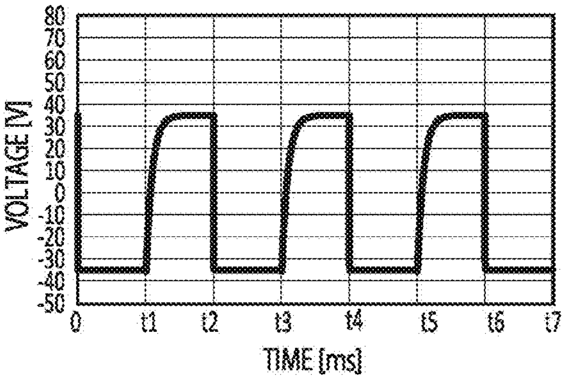
Figure 9D:
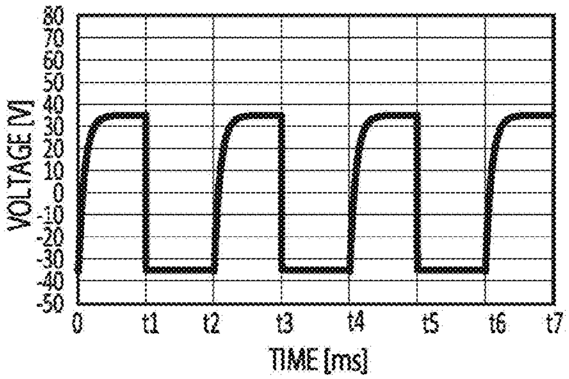
Figure 9E:
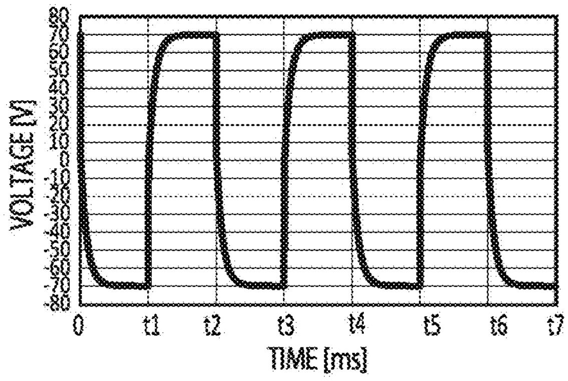

FIGS. 9A and 9B illustrate voltage waveforms in a case where the period in which the control signal 304*a* and the control signal 304*b* are turned ON or turned OFF concurrently is not provided like the first embodiment. The voltage waveform of the driving voltage 305*a* (the voltage waveform of the output terminal 414*a*) is illustrated in FIG. 9C, and the voltage waveform of the driving voltage 305*b* (the voltage waveform of the output terminal 414*b*) is illustrated in FIG. 9D. In the time t2, the time t4, and the time t6, the driving voltage 305*a* immediately falls, and the steep voltage change occurs. Likewise, in the time t1, the time t3, and the time t5, the driving voltage 305*b* immediately falls, and the steep voltage change occurs. The circulation pump voltage that is a difference between the driving voltage 305*a* and the driving voltage 305*b* has a voltage waveform illustrated in FIG. 9E. In the rise of the circulation pump voltage in the time t1, the time t3, and the time t5, the circulation pump voltage immediately rises from-70 V to near 0 V, and the steep voltage change occurs. Likewise, in the fall of the circulation pump voltage in the time t2, the time t4, and the time t6, the circulation pump voltage is immediately reduced from +70 V to near 0 V, and the steep voltage change occurs. The steep voltage change of the circulation pump voltage is caused by the output terminal 414*a* and the output terminal 414*b* of the full bridge circuit 801 are immediately reduced from +35 V to −35 V since there are no resistor 416 and resistor 418 on the low side.

Figure 10A:
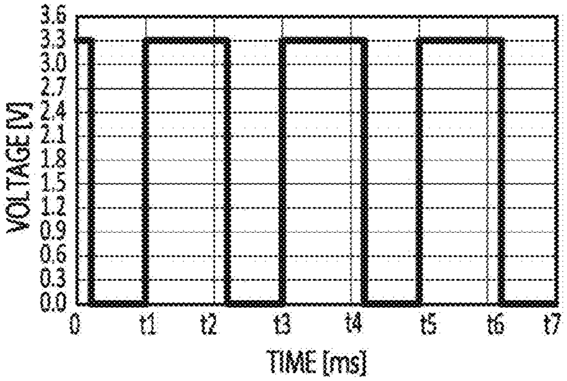
FIGS. 10A, 10B, 10C, 10D, and 10E are diagrams illustrating a voltage waveform of input and output of the pump driving circuit.
Figure 10B:
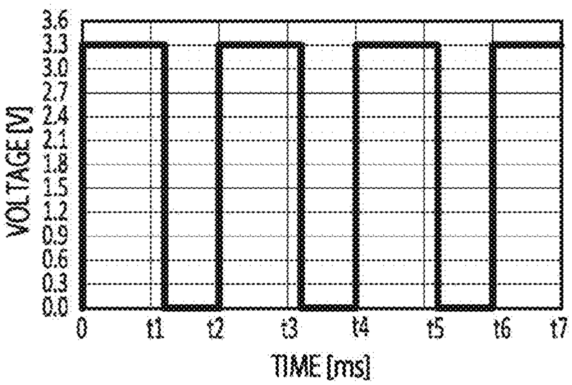
Figure 10C:
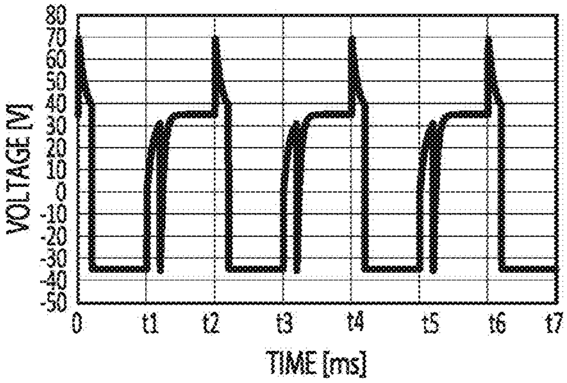
Figure 10D:
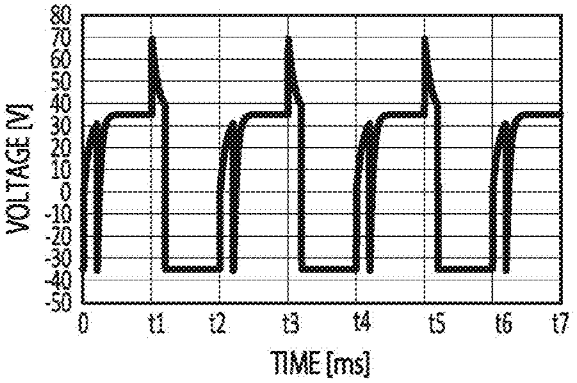
Figure 10E:
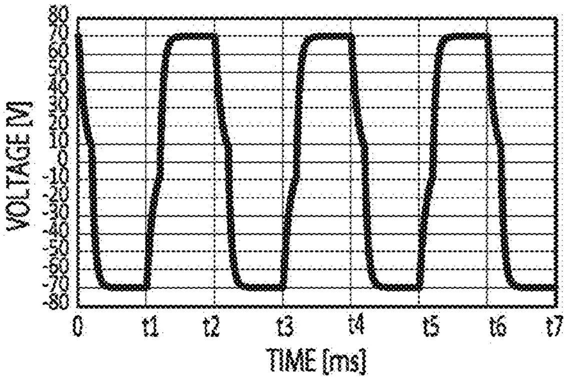

As described in the second embodiment, it is possible to change the circulation pump voltage in two stages and adjust the rise time, the fall time, or the like by providing the period in which the control signal 304*a* and the control signal 304*b* are turned ON or turned OFF concurrently. As described in also the second embodiment, a case where the period in which the control signal 304*a* and the control signal 304*b* are turned ON concurrently is provided is described. The driving voltage 305*a* (the voltage waveform of the output terminal 414*a*) is illustrated in FIG. 10C, and the voltage waveform of the driving voltage 305*a* (the voltage waveform of the output terminal 414*a*) is illustrated in FIG. 10D. The voltage waveform of the circulation pump voltage is illustrated in FIG. 10E.

There is no steep rise of the circulation pump voltage in the time t1, the time t3, and the time t5, and a moderate rise is obtained. Likewise, there is no steep fall of the circulation pump voltage in the time t2, the time t4, and the time t6, and a moderate fall is obtained. As described above, it is possible to provide a slope to the circulation pump voltage and drive the circulation pump 202 without the steep voltage change also in the full bridge circuit 402 on which only the resistor 415 and the resistor 417 on the high side are arranged.

Note that, although only the resistor on the high side is provided in the present embodiment, it is not limited thereto, and it is also possible to obtain the above-described effect by providing only the resistor on the low side. Additionally, the period in which the control signal 304*a* and the control signal 304*b* are turned OFF concurrently may be provided.

Even in a case where a main circuit configuration is simplified more than that in the first embodiment, it is possible to reduce the maximum voltage of the entire circuit including the peripheral circuit and to reduce the withstand voltage of a used element.

Fourth Embodiment

In the first embodiment, a resistor having a specific resistance value is used as the four resistors included in the full bridge circuit 402. Additionally, in the second embodiment, it is described that it is possible to adjust the driving voltage 305*a* and the driving voltage 305*b* by changing the control signal 304*a*, the control signal 304*b*, and the resistance values of the four resistors.

In the present embodiment, a case where the resistance values that the four resistors have are variable is described. In light of adjustment and the like of the driving voltage 305*a* and the driving voltage 305*b* according to the load capacity, at least one of the four resistors included in the full bridge circuit 402 is a variable resistor, and the driving voltage 305*a* and the driving voltage 305*b* are adjusted dynamically. Thus, it is possible to drive the circulation pump 202 stably with no steep change of the circulation pump voltage. It is possible to adjust the driving voltage 305*a* and the driving voltage 305*b* dynamically also by using a digital potentiometer instead of the variable resistor.

Additionally, the variable resistor may be used to solve variations of the resistance values of the four resistors included in the full bridge circuit 402. For example, one of the four resistors included in the full bridge circuit 402 is a fixed resistor, and the other three resistors are the variable resistors. It is possible to equalize the resistance values of the four resistors by adjusting the three variable resistors to the resistance value of the fixed resistor. It is also possible to equalize the resistance values of the four resistors by using the variable resistors as the four resistors. Thus, it is possible to generate the circulation pump voltage with less distortion.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-143463, filed Sep. 5, 2023, which is hereby incorporated by reference wherein in its entirety.

What is claimed is:

1. A driving circuit configured to drive a piezoelectric element including a first end and a second end, comprising:

a power supply including a positive electrode configured to output a positive voltage and a negative electrode configured to output a negative voltage;

a first switching element and a third switching element including input terminals connected to the positive electrode of the power supply;

a second switching element and a fourth switching element including input terminals connected to the negative electrode of the power supply;

a first resistor configured to connect an output terminal of the first switching element and the first end of the piezoelectric element;

a second resistor configured to connect the first end of the piezoelectric element and an output terminal of the second switching element;

a third resistor configured to connect an output terminal of the third switching element and the second end of the piezoelectric element;

a fourth resistor configured to connect the second end of the piezoelectric element and an output terminal of the fourth switching element; and a control unit configured to supply a first control signal to a control terminal of the first switching element and a control terminal of the second switching element and supply a second control signal, which is an opposite phase signal of the first control signal, to a control terminal of the third switching element and a control terminal of the fourth switching element.

2. The driving circuit according to claim 1, wherein the first control signal and the second control signal are square waves.

3. The driving circuit according to claim 2, wherein there is a period in which a voltage is applied to the first control signal and the second control signal concurrently.

4. The driving circuit according to claim 2, wherein there is a period in which a voltage is not applied to the first control signal and the second control signal concurrently.

5. The driving circuit according to claim 1, wherein a resistance value of the first resistor, a resistance value of the second resistor, a resistance value of the third resistor, and a resistance value of the fourth resistor are all equal to each other.

6. The driving circuit according to claim 1, wherein a resistance value of the first resistor and a resistance value of the third resistor are equal to each other, a resistance value of the second resistor and a resistance value of the fourth resistor are equal to each other, and the resistance value of the first resistor is greater than the resistance value of the second resistor.

7. The driving circuit according to claim 1, wherein a resistance value of the first resistor and a resistance value of the third resistor are equal to each other, a resistance value of the second resistor and a resistance value of the fourth resistor are equal to each other, and the resistance value of the second resistor is greater than the resistance value of the first resistor.

8. The driving circuit according to claim 1, wherein at least one of the first resistor, the second resistor, the third resistor, and the fourth resistor is a variable resistor.

9. The driving circuit according to claim 1, wherein at least one of the first resistor, the second resistor, the third resistor, and the fourth resistor is a digital potentiometer.

10. The driving circuit according to claim 1, wherein the first switching element and the third switching element are P-MOSFETs while the second switching element and the fourth switching element are N-MOSFETs, or the first switching element and the third switching element are N-MOSFETs while the second switching element and the fourth switching element are P-MOSFETs.

11. The driving circuit according to claim 1, wherein the first switching element and the third switching element are pnp transistors while the second switching element and the fourth switching element are npn transistors, or the first switching element and the third switching element are npn transistors while the second switching element and the fourth switching element are pnp transistors.

12. The driving circuit according to claim 1, wherein the power supply includes a first power supply including the positive electrode and a second power supply including the negative electrode.

13. A driving circuit configured to drive a piezoelectric element including a first end and a second end, comprising:

a power supply including a positive electrode configured to output a positive voltage and a negative electrode configured to output a negative voltage;

a first switching element and a third switching element including input terminals connected to the positive electrode of the power supply;

a second switching element and a fourth switching element including input terminals connected to the negative electrode of the power supply;

a fifth resistor configured to connect an output terminal of the first switching element and an output terminal of the second switching element;

a sixth resistor configured to connect an output terminal of the third switching element and an output terminal of the fourth switching element;

a control unit configured to supply a first control signal to a control terminal of the first switching element and a control terminal of the second switching element and supply a second control signal, which is an opposite phase signal of the first control signal, to a control terminal of the third switching element and a control terminal of the fourth switching element, wherein in a case where the fifth resistor connects the output terminal of the first switching element and the first end of the piezoelectric element, the sixth resistor connects the output terminal of the third switching element and the second end of the piezoelectric element, and in a case where the fifth resistor connects the first end of the piezoelectric element and the output terminal of the second switching element, the sixth resistor connects the second end of the piezoelectric element and the output terminal of the fourth switching element.

14. The driving circuit according to claim 13, wherein the first control signal and the second control signal are square waves.

15. The driving circuit according to claim 14, wherein there is a period in which a voltage is applied to the first control signal and the second control signal concurrently.

16. The driving circuit according to claim 14, wherein there is a period in which a voltage is not applied to the first control signal and the second control signal concurrently.

17. The driving circuit according to claim 13, wherein a resistance value of the fifth resistor is equal to a resistance value of the sixth resistor.

18. The driving circuit according to claim 13, wherein the power supply includes a first power supply including the positive electrode and a second power supply including the negative electrode.

19. A printing apparatus, comprising:

a driving circuit configured to drive a piezoelectric element including a first end and a second end, the driving circuit including:

a power supply including a positive electrode configured to output a positive voltage and a negative electrode configured to output a negative voltage;

a first switching element and a third switching element including input terminals connected to the positive electrode of the power supply;

a second switching element and a fourth switching element including input terminals connected to the negative electrode of the power supply;

a first resistor configured to connect an output terminal of the first switching element and the first end of the piezoelectric element;

a second resistor configured to connect the first end of the piezoelectric element and an output terminal of the second switching element;

a third resistor configured to connect an output terminal of the third switching element and the second end of the piezoelectric element;

a fourth resistor configured to connect the second end of the piezoelectric element and an output terminal of the fourth switching element; and a control unit configured to supply a first control signal to a control terminal of the first switching element and a control terminal of the second switching element and supply a second control signal, which is an opposite phase signal of the first control signal, to a control terminal of the third switching element and a control terminal of the fourth switching element.

* * * * *